United States Patent [19]

Moriyama

[11] Patent Number: 4,483,646

[45] Date of Patent: Nov. 20, 1984

[54] APPARATUS FOR DISTRIBUTING POWDERED PARTICLES

[75] Inventor: Takashi Moriyama, Tokyo, Japan

[73] Assignee: Denka Consultant & Engineering Co., Ltd., Tokyo, Japan

[21] Appl. No.: 375,826

[22] Filed: May 7, 1982

[51] Int. Cl.$^3$ .............................................. B65G 53/66
[52] U.S. Cl. ....................................... 406/14; 406/94; 406/123; 406/142
[58] Field of Search ................. 406/1, 12, 14, 94, 123, 406/124, 142, 155, 156, 93; 266/89, 44; 222/1

[56] References Cited

U.S. PATENT DOCUMENTS

| | | | |
|---|---|---|---|
| 1,549,285 | 8/1925 | Baker | 406/123 |
| 3,837,540 | 9/1974 | Wagener | 406/94 |
| 3,923,343 | 12/1975 | Bird | 406/14 |

Primary Examiner—Jeffrey V. Nase
Assistant Examiner—Daniel R. Edelbrock
Attorney, Agent, or Firm—Koda and Androlia

[57] ABSTRACT

An apparatus for distributing powdered particles from a single pressurized transporting vessel to a plurality of receiving ends through a plurality of transporting pipes. The vessel is supplied with a pressurized gas to fluidize the powdered particles, which then are distributed to the transporting pipes which include discharge control valves to control the discharging rate of the particles in each of the transporting pipes. The transporting pipes are supplied with booster gas, the flow rate of which is controlled by a booster flow rate control valve. The booster flow rate control valve in each pipe is controlled in cascade by a booster flow rate controller receiving an output signal from a differential pressure detector for detecting a differential pressure of a discharging nozzle at the end of the pipes. Since the discharging rate of the powdered particles is in proportion to the differential pressure, the discharging rate can be controlled at a desired rate by the booster flow rate controller in accordance with the differential pressure of the discharging nozzle.

5 Claims, 2 Drawing Figures

APPARATUS FOR DISTRIBUTING POWDERED PARTICLES

BACKGROUND OF THE INVENTION

1. Field of the Invention

The present invention relates to an apparatus for distributing powdered particles, and more particularly to an apparatus for distributing materials such as powdered particles by a pressurized air to a plurality of receiving ends at a constant rate.

2. Description of the Prior Art

In the conventional distributing apparatus, it is necessary to provide a plurality of pressurized transporting vessels for each transporting pipes connected to a plurality of receiving ends. Therefore, the conventional apparatus has such disadvantages that the fabrication of the whole system is complicated and the equipment cost thereof is high.

In order to obviate the above disadvantages, there has been proposed such an apparatus in which a distributor is interposed within a transporting conduit or line to distribute the materials to a plurality of receiving ends from the distributor, as shown in Japanese Patent Laid-Open (unexamined publication) No. 64780/77. However, the above apparatus, although necessitating less number of the pressurized transporting vessles, necessarily includes the distribution in addition to the vessel and it is difficult to set a suitable distributing ratio to the distributor.

SUMMARY OF THE INVENTION

Therefore, it is an object of the present invention to provide an apparatus for distributing powdered particles from a single transporting vessel to a plurality of receiving ends without necessitating a plurality of transporting vessels or distributors.

It is also an object of the present invention to provide an apparatus for distributing powdered particles from a single transporting vessel to a plurality of receiving ends with a desired, constant discharging rate of the powdered particles for each receiving end.

To accomplish the above objects, the present invention includes a pressure line for supplying a pressurized gas to the vessel; a plurality of transporting pipes extending from the transporting vessel to a plurality of receiving ends, through the pipes the powdered particles in the vessel being distributed to the receiving ends; a control valve provided in each of the transporting pipes for controlling a discharge rate of the powdered particles in each of the transporting pipes; a plurality of booster lines for supplying booster gas to each of the transporting pipes; and a booster flow rate control valve to control a flow rate of booster gas supplied to each transporting pipe. Therefore, the discharging rate of the powdered particles in each transporting pipe is controlled by adjusting the control valve or the booster flow rate control valve.

The present invention, in addition to the above, further includes a plurality of booster flow rate controllers and a plurality of differential pressure detectors for substantially detecting each differential pressure of each of discharging nozzles at the end of the transporting pipes. Since the discharging rate of the powdered particles is in proportion to the differential pressure, the discharging rate of the powdered particles can be controlled by cascade-controlling the booster flow rate control valves by the booster flow rate controllers supplied with an output from the differential pressure detectors.

DESCRIPTION OF THE PREFERRED EMBODIMENT

Figure 1:
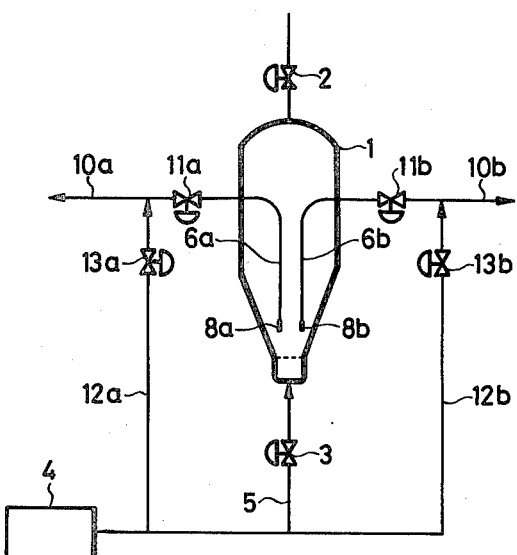
FIG. 1 is a circuit diagram showing a first embodiment of the apparatus for distributing powdered particles according to the present invention.

FIG. 1 shows a first embodiment of a distributing apparatus according to the present invention. Reference numeral 1 denotes a pressurized transporting vessel, numeral 2 denotes a feed shut-off valve to operate feeding materials such as powdered particles to the vessel 1, numeral 3 denotes a pressure valve to control a pressure of pressurized transporting gas such as air to be supplied to the vessel 1 from a gas supplying source 4, and numeral 5 denotes a line for the pressurized transporting gas. A plurality of discharging pipes, for example, a pair of discharging pipes 6a and 6b are symmetrically disposed to the vessel 1 and bent downwardly in the vessel 1. The discharging pipes 6a and 6b at upper ends thereof penetrate through the vessel 1 and are disposed on a common horizontal plane near the vessel to secure a steady flow rate or discharging rate of the powdered particles. Discharging nozzles 8a and 8b are connected to the lower end of the discharging pipes 6a and 6b, respectively, and open opposed to a fluidized bed of an air chamber in the vessel 1. Reference numerals 10a and 10b denote transporting pipes connected to the discharging pipes 6a and 6b, respectively, for transporting the particles to the receiving end (not shown), numerals 11a and 11b denote discharge control valves, numerals 12a and 12b denote booster lines connected to the gas supplying source 4 for supplying booster gas to the transporting pipes 10a and 10b, and numerals 13a and 13b denote booster flow rate control valves interposed in the booster lines, respectively.

With the above system, the powdered particles are distributed at a constant and desired rate from the vessel 1 to the receiving ends by controlling the pressure valve 3, discharge control valves 11a and 11b and booster flow rate control valves 13a and 13b, respectively. More specifically, a discharging rate of the powdered particles changes in inverse proportion to a flow rate of booster gas supplied to the transporting pipes if the transporting vessel is supplied with the pressured gas substantially at a constant flow rate. Accordingly, the discharging rate of the powdered particles in each of the transporting pipes 10a and 10b can be controlled at a desired rate by controlling each of the booster flow rate control valves 13a and 13b. Additionally, the discharging rate of the powdered particles in each of the transporting pipes changes by adjusting the discharge control valves 11a and 11b, and therefore, a distributing ratio of the powdered particles can be adjusted for each of the transporting pipes. As a result, according to the above embodiment of the present invention, it is unnecessary to provide a plurality of the transporting vessels corresponding to each of the transporting pipes or an additional distributor as in the conventional apparatus, whereby it is possible to simplify the structure of the apparatus as a whole and to decrease the equipment cost thereof.

In the actual operation of the apparatus, the discharge control valves 11a and 11b and booster flow rate control valves 13a and 13b are operated based on the discharging rate of the powdered particles actually discharged into the transporting pipes 10a and 10b. It may be, however, difficult to precisely detect the discharging rate of the powdered particles in each of the transporting pipes, whereby the insight of the operator should be relied on. Accordingly, there may be some possibility that the powdered particles cannot be distributed at a precise, desired distributing ratio, and that since the discharging rate of the powdered particles is controlled by the operation of the discharge control valves 11a and 11b, a valve body of the control valves will be worn out within a relatively short time.

In view of the above, the inventor has discovered upon various experiments on the above-described apparatus that a flow rate of the pressurized gas through the fluidized bed in the vessel should be set at some appropriate value to obtain a desired total flow rate of the powdered particles discharged from the vessel to the transporting pipes, and that each of the discharging rate of the particles in each of the transporting pipes is in proportion to a pressure loss in the discharging nozzle of each transporting pipe if the pressurized gas is maintained at the above-mentioned appropriate value. Namely, if the discharging rate of the powdered particles reduces in the discharging nozzle, the pressure loss reduces in the discharging nozzle, and vice versa. Accordingly, the discharging rate of the powdered particles in each transporting pipe is detected by detecting each of the pressure loss in each discharging nozzle, and therefore, the discharging rate of the powdered particles can be properly and precisely controlled by controlling in cascade the booster flow rate valve in accordance with the pressure loss defining a differential pressure.

Figure 2:
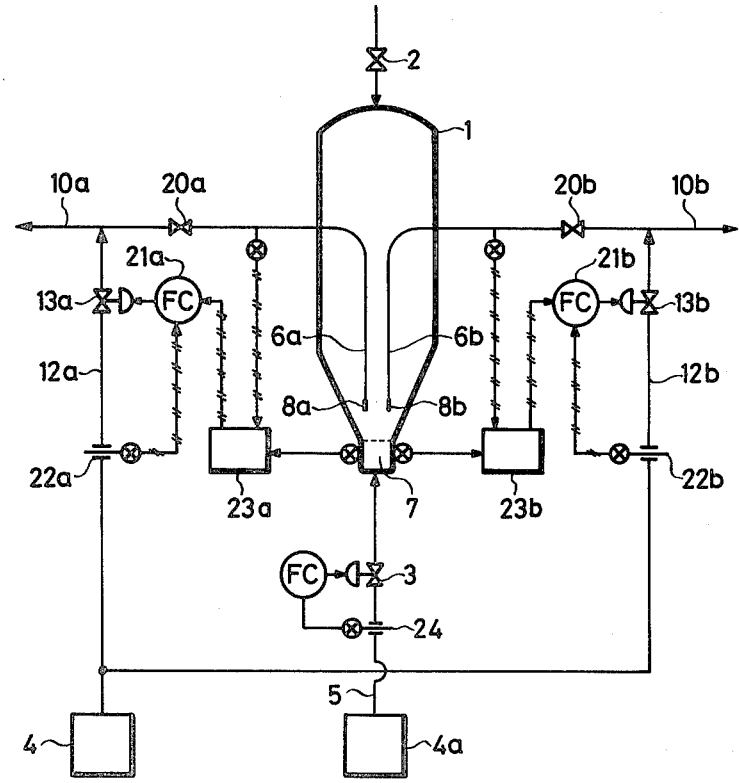
FIG. 2 is a circuit diagram showing a second embodiment of the apparatus according to the present invention.

FIG. 2 shows a second embodiment in which the above-described controlling method is applied to the apparatus shown in FIG. 1. In FIG. 2, the same reference numerals with those in FIG. 1 denote same elements and detailed explanation thereof will be omitted. Reference numerals 20a and 20b denote ON-OFF discharge valves in the transporting pipes 10a and 10b, respectively, numerals 21a and 21b denote booster flow rate controllers in the booster lines 12a and 12b, respectively, numerals 22a and 22b denote booster flow rate detectors, and numerals 23a and 23b denote differential pressure detectors to detect differential pressures between the discharging nozzles 8a and 8b and discharging pipes 6a and 6b, or more specifically differential pressures between the pressure in the air chamber 7 and the pressure in the booster lines or transporting pipes. Reference numeral 24 denotes a pressurized gas flow rate detector. The differential pressure detectors 23a and 23b may be alternatively disposed at a place where the pressure loss of portion where high pressure loss occurs can be detected, such as between both ends of a bent portion of the pipes, the discharge nozzles or the transporting pipes.

In operation, the flow rate of the pressurized gas is controlled by adjusting the pressure valve 3 based on an output signal from the pressurized gas flow rate detector 24 so that the flow rate of the pressurized gas is set at a suitable value for aeration corresponding to the total discharging rate of the powdered particles. Each of the booster flow rate control valves 13a and 13b is individually controlled by the controllers 21a and 21b based on an output signal from each of the differential pressure detectors 23a and 23b detecting the pressure loss of each discharge nozzle. As a result, the discharging rate of the powdered particles is precisely and individually controlled in each of the transporting pipes, and a desired distributing ratio of the powdered particles for each of the transporting pipes can be secured by adjusting each of setting values of the booster flow rate controllers. The discharge valves 20a and 20b can be fully opened during transportation of the powdered particles, since the discharging rate of the powdered particles in each transporting pipe is solely controlled by the flow rate of booster gas in each transporting pipe, thereby to obviate the disadvantage as in the prior art that the discharge valves are easily worn out.

The above-described apparatus can be applied to any types of distributing system of the powdered particles. Yet, if the apparatus according to the present invention is applied to a pulverized coal supplying system or refining agent supplying system for a blast furnace, different gas can be used for the pressurized gas and booster gas, thereby to be able to increase combustibility of the furnace and secure the safety of the furnace.

I claim:

1. An apparatus for distributing powdered particles from a single pressurized transporting vessel to a plurality of receiving ends, comprising:
    a pressure line for supplying a pressurized gas to the vessel;
    a plurality of transporting pipes extending from the transporting vessel to the receiving ends, through said pipes the powdered particles in the vessel being distributed to the receiving ends, said transporting pipes having discharging nozzles at ends of said transporting pipes inside the vessel;
    a plurality of booster lines for supplying booster gas to each of said transporting pipes;
    a plurality of booster flow rate control valves provided in each of said booster lines for controlling a flow rate of booster gas supplied to each of said transporting pipes; and
    a plurality of booster flow rate controllers for controlling said booster flow rate control valves, respectively, substantially based on each differential pressure of each of said discharging nozzles.

2. An apparatus for distributing powdered particles as set forth in claim 1, further comprising a plurality of differential pressure detectors for substantially detecting each differential pressure of each of said discharging nozzles and supplying an output signal to each of said booster flow rate controllers.

3. An apparatus for distributing powdered particles as set forth in claim 2, wherein said differential pressure detectors detect each differential pressure between said discharging nozzles and portions of said transporting pipes outside the vessel.

4. An apparatus for distributing powdered particles as set forth in claim 2, wherein said differential pressure detectors detect each differential pressure between an air chamber at a lower end of the vessel and each of said transporting pipes.

5. An apparatus for distributing powdered particles as set forth in claim 1 or 2, further comprising:
    a pressurized gas flow rate control valve provided in said pressure line; and
    a pressurized gas flow rate controller for controlling said pressurized gas flow rate control valve.

* * * * *